United States Patent
Kamepalli

(10) Patent No.: US 10,235,740 B2
(45) Date of Patent: Mar. 19, 2019

(54) FLEXIBLE INFORMATION HANDLING SYSTEM DISPLAY RESOLUTION SCALING

(71) Applicant: Dell Products L.P., Round Rock, TX (US)

(72) Inventor: Srinivas Kamepalli, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 15/381,326

(22) Filed: Dec. 16, 2016

(65) Prior Publication Data

US 2018/0174273 A1    Jun. 21, 2018

(51) Int. Cl.
G09G 5/02 (2006.01)
G06T 3/40 (2006.01)
G06T 1/20 (2006.01)

(52) U.S. Cl.
CPC .......... *G06T 3/4053* (2013.01); *G06T 1/20* (2013.01)

(58) Field of Classification Search
CPC ......... H04N 21/440263; H04N 7/0125; H04N 21/4402; G09G 5/005; G06T 3/40
See application file for complete search history.

(56) References Cited

U.S. PATENT DOCUMENTS

| | | | | |
|---|---|---|---|---|
| 2010/0134684 A1* | 6/2010 | Yamada | .................. | G09G 5/14 348/553 |
| 2016/0104457 A1* | 4/2016 | Wu | ..................... | G09G 5/39 345/522 |
| 2016/0132284 A1* | 5/2016 | Amara Venkata | ..... | G09G 5/377 345/634 |
| 2016/0150180 A1* | 5/2016 | Kozuka | ................. | H04N 5/913 386/254 |

* cited by examiner

*Primary Examiner* — Hau H Nguyen
(74) *Attorney, Agent, or Firm* — Zagorin Cave LLP; Robert W. Holland

(57) ABSTRACT

An information handling system communicates visual information to a display in a first pixel value format and the display converts the first pixel formation to a native format with a graphics processing unit. The graphics processing unit adapts its programming to convert various input pixel values into desired native formats, such as by converting High Definition input into Ultra High Definition native format. The information handling system and display coordinate through configuration information to identify and program the display graphics processor to perform desired pixel conversion.

17 Claims, 2 Drawing Sheets

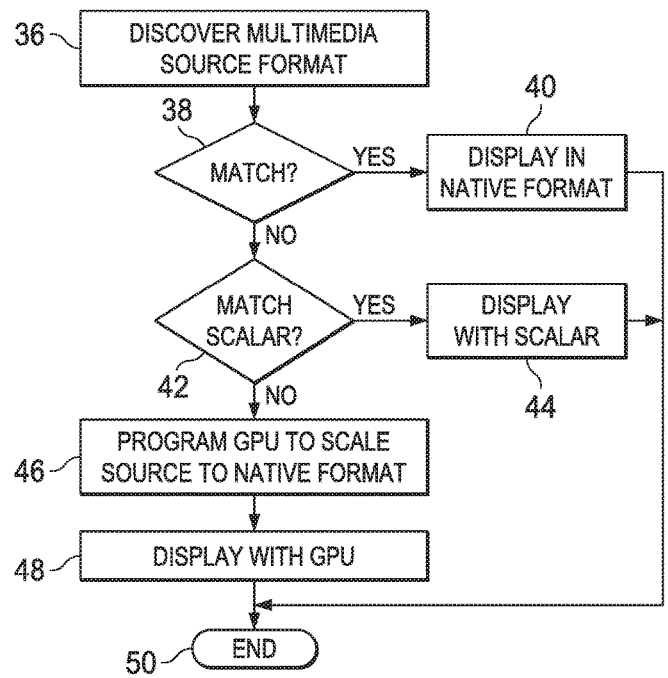
FIG. 2
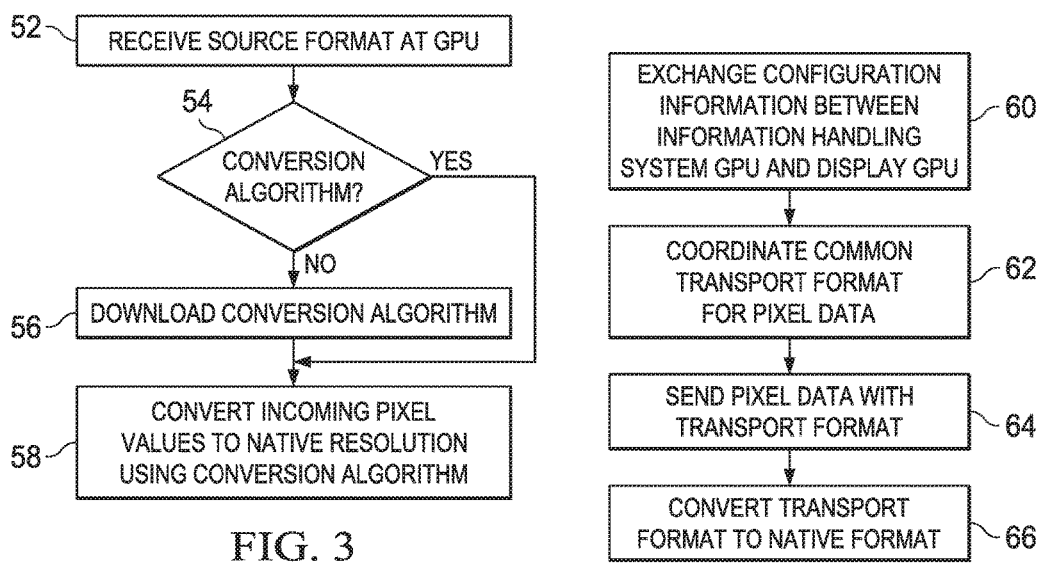
FIG. 3
FIG. 4

FLEXIBLE INFORMATION HANDLING SYSTEM DISPLAY RESOLUTION SCALING

BACKGROUND OF THE INVENTION

Field of the Invention

The present invention relates in general to the field of information handling system visual information presentation, and more particularly to a flexible information handling system display resolution scaling.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically process information for presentation to an end user at a display device. Visual information is generally stored as graphics files that define how the information is presented. A simple example is textual information stored as words, such as with ASCII defined letters, which are presented with selectable font, color and size. More complex visual information includes graphics that define an image presentable with different sizes and appearances. In many instances, graphics may be stored in a compressed file format that reduces memory requirements, such as JPEG for still images and MPEG for moving images. Often, information handling systems simultaneously present visual images at a display that are derived from a variety of formats. In order to provide visual images in a manner presentable by a display, information handling systems typically send visual information as pixel values using standardized formats, such as High Definition (HD) 1920×1080 pixels or Ultra High Definition (UHD)/4k formats having 3840×2160 (or similar) pixels. As an example, information handling systems send pixel data in HD formats through an HDMI or DisplayPort cable using a port having specialized hardware that meets the HDMI or DisplayPort standardized communication protocols.

One difficulty that arises in the presentation of visual information is that display sizes and visual information sizes vary over time and with different hardware platforms. As an example, multimedia movie files often have different aspect ratios, including movie-theater specific sizes that do not conform to defined consumer standards. As another example, with the release of higher definition displays, such as 4k display resolutions, older formats with lower resolution generally have to have pixel values altered in order to present the visual information as visual images. For instance, a 4K resolution display device will accept HD resolution multimedia images through an HDMI port to present the information with a reduced resolution. However to present the lower resolution images, the display device must change the scale of the images that it receives to match the scale that it will present. To achieve presentation of a scaled image, display devices typically include a scalar processor that performs a single high rate data transformation specific to the changed resolution. A scalar processor is defined as a processor that processes only one datum, such as integers or floating point numbers, in what is commonly referred to as a Single Instruction, Single Data (SISD) operation. Display scalars scale from one specific format to another by using a specialized operation designed for the conversion. An advantage of a scalar processor is that it tends to have a low cost when mass produced to meet specific format conversions, such as converting and HD 1280×720 multimedia stream into a full HD 1920×1080 image. A disadvantage is that scalars lack flexibility to adapt to tasks other than their designed function.

SUMMARY OF THE INVENTION

Therefore, a need has arisen for a system and method which provide flexible information handling system display resolution scaling.

In accordance with the present invention, a system and method are provided which substantially reduce the disadvantages and problems associated with previous methods and systems for adapting a display to present visual images at resolutions other than the display's native resolution. A display leverages a graphics processor that accepts pixel values from an external source in a non-native format and converts the pixel values to a native format for presentation at the display.

More specifically, an information handling system processes visual information into pixel values to present a visual image at a display, and communicates the pixel values to the display through a communication medium, such as a graphics port and cable. The display presents visual information as visual images with a native resolution, such as a 4K Ultra High Definition resolution, that differs from the pixel value resolution provided by the information handling system. A graphics processor integrated in the display is programmable to convert different types of transport pixel values into native resolution pixel values. The graphics processor of the display coordinates an acceptable transport pixel value format, programs itself to convert the transport pixel values into the native pixel values, and converts the transport pixel values into the native pixel values for generation of the visual image at the display. In one embodiment, the display includes a scalar processor that performs conversion from one type of transport pixel value into the native pixel value format so that the scalar processor is used instead of the graphics processor when the transport pixel value format is compatible with the scalar. In another alternative embodiment, the information handling system and display coordinate a transport pixel value format so that a conversion algorithm is provided to the graphics processor of the display and programmed for application to convert incoming pixel values to the native pixel value format.

The present invention provides a number of important technical advantages. One example of an important technical advantage is that a graphics processor integrated in a display programmatically adapts incoming pixel values to a native format in flexible manner. Integration of a graphics processor into the display provides a low cost but flexible conversion of pixel values where the display native format does not support cost-effective scalar processor development. For example, at introduction of new display technology that has ill-defined or fluctuating standards definitions, the graphics processor integrated in the display adapts to the native format and remains available for programming of addition pixel value conversions in the event related but different types of transport pixel values become available. The display graphics processor programmatically accepts conversion algorithms to adapt the display native resolution to transport pixel value formats available from a source information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts a flow diagram of a process for selecting a display resolution scaling operation with a GPU available at the display to convert display formatting;

FIG. 3 depicts a flow diagram of a process for selecting a conversion algorithm at the display GPU; and FIG. 4 depicts a flow diagram of a process for coordinating conversion of a transport format into a display format at a display GPU.

DETAILED DESCRIPTION

Figure 1:
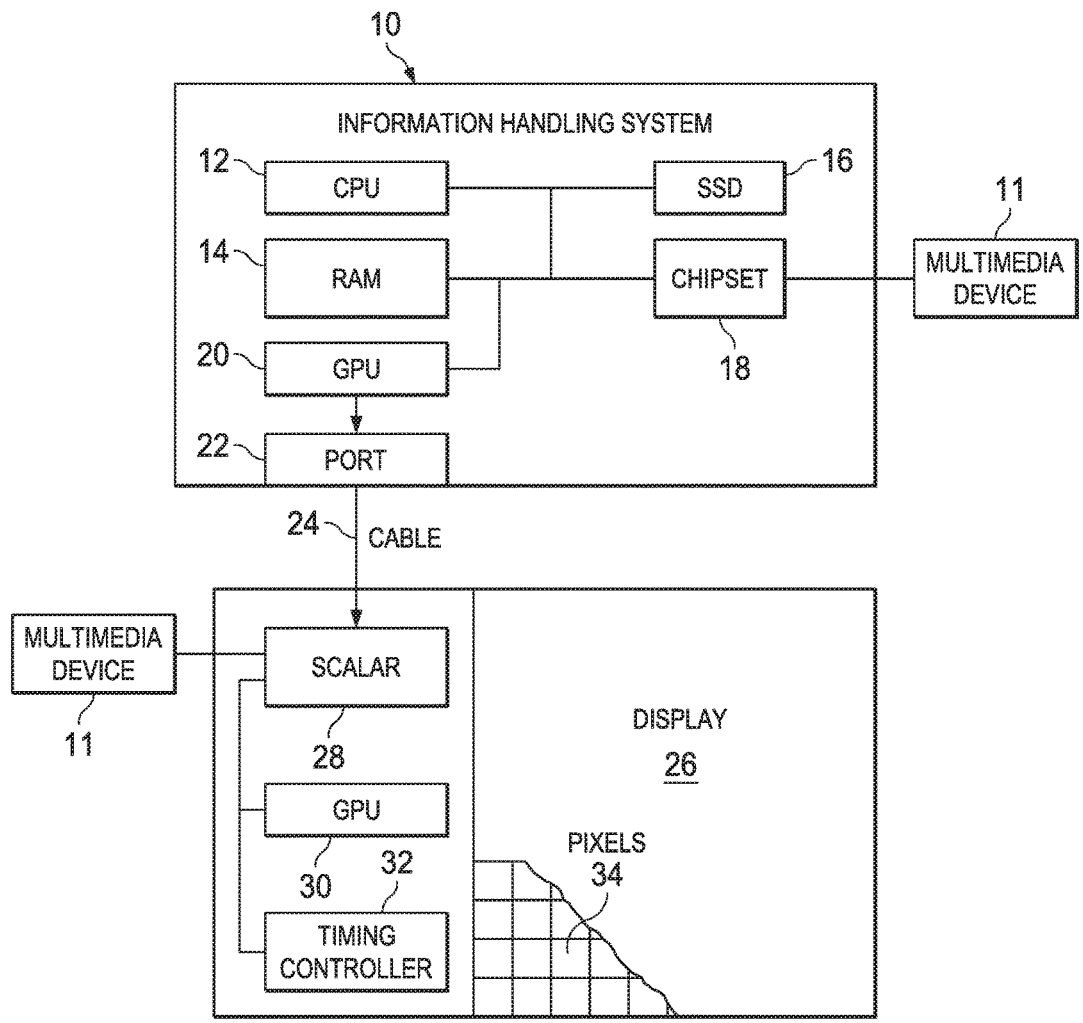
FIG. 1 depicts a block diagram of an information handling system interfaced with a display and configured for flexible display resolution.

An information handling system communicates pixel values in a transport format to a graphics processor integrated in a display so that the graphics processor programmatically converts the transport format to a native format for presentation of visual images at the display. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, a block diagram depicts an information handling system 10 interfaced with a display 26 and configured for flexible display resolution. Information handling system 10 processes information with a variety of processing components disposed in a housing. In the example embodiment, a central processing unit (CPU) 12 executes instructions stored in random access memory (RAM) 14 to generate visual information for presentation at display 26. A solid state drive (SSD) 16 or other persistent storage device stores applications and information for use by CPU 12, such as an operating system and applications that cooperate to generate visual information. A chipset 18 includes processors and embedded code that manages physical interactions between processing components, such as coordination of memory access and application of power. A graphics processor unit (GPU) 20 receives visual information from CPU 12 and converts the visual information into a pixel format for transport to display 26, such as through a graphics port 22 and graphics cable 24. For example, the pixel value transport format provides pixel values that each pixel 34 of display 26 will apply to present the visual information as visual images.

During normal operations, GPU 20 provides a transport format for pixel values that is compatible with a display resolution of display 26, such as a high definition resolution of 1920×1080 pixels. A timing controller 32 forwards the pixel values to pixels 34 in a scan pattern that creates the visual image. When the transport format matches the display 26 native resolution, timing controller 32 forwards pixel values provided from GPU 20 pixels 34 in a timed scan pattern. In some instances. GPU 20 provides a transport format that differs from the native resolution of display 26, such as where High Definition pixel values are 720 lines instead of 1080 lines. In the example embodiment, a scalar 28 integrated in display 26 is available to perform a conversion at display 26 between the transport and native pixel value formats. Scalar processor 28 handles a defined conversion and provides the converted pixel values to timing controller 28.

In addition, a multimedia device 11, such as a DVD or Blu-Ray Disc device, generates multimedia information for presentation at display 26. In the example embodiment, one multimedia device 11 couples directly to display 26 and another multimedia device couples to information handling system 10. For example, multimedia device 11 interfaces with display 26 or chipset 18 through a graphics ports, such as an HDMI, type-C. USB, DisplayPort or other type of graphics port. Multimedia device 11 generates pixel values in a transport format for presentation at display 26. In normal operations, multimedia device 11 provides pixels values compatible with display resolution of display 26 so that timing controller 32 forwards the pixel values to pixels 34 for presentation of a visual image. If the transport format of multimedia device 11 is different than the native resolution of display 26, scalar 28 adjusts the pixel values to have the native resolution. A difficulty arises, however, where the transport format of multimedia device 11 is not compatible with display 26 native resolution or conversion by scalar 28. For example, a 4k native resolution of display 26 that is provided a transport format for DVD would need a scalar 28 that manages the specific data conversion from DVD to 4k. In such a situation, pixel values are converted from the transport format to the display format by processing through a graphics processor unit (GPU), such as GPU 20 disposed in information handling system 10 or GPU 30 disposed in display 26. For example, multimedia device 11 provides pixel values to information handling system 10 chipset 18, such as through an HDMI port, and forwards the pixel values to GPU 20 for conversion to a 4K format. GPU 20 then provides the pixel values to display 26 in a format that display 26 can present as set forth below. GPU 20 and/or GPU 30 provides programmable adaptability to load a conversion algorithm as needed for different types of conversions, such as by maintaining a library of conversion algorithms in a local ROM or retrieving conversion algorithms from a network resource.

If GPU 20 provides a transport pixel value format that is not compatible with display 26's native resolution, visual images will not correctly present at display 26. In order to adapt display 26 to presentation of visual images from an incompatible pixel value source, display 26 integrates a graphics processor unit (GPU) 30 and directs incompatible pixel values to the GPU 30 instead of scalar 28. For example, if information handling system 10 has an HDMI cable that sends High Definition resolution pixel values, GPU 30 integrated in display 26 receives the pixels from port 22 and applies a conversion algorithm that converts the pixel values to a native format of display 26, such as an Ultra High Definition pixel value format. The converted pixel values are then forwarded to timing controller 32 for presentation at an Ultra High Definition resolution array of pixels 34. A stream of pixel values are directed to timing controller 32 directly from port 22 in the case of a matching resolution, from scalar 28 in case of a match with the operation performed by scalar 28 or from GPU 30 in case of a mismatch of resolution that needs additional processing to adapt to display 26 native resolution. In one example embodiment, GPU 30 determines the transport pixel format and directs the pixel value stream accordingly with control provided by a multiplexor or switch.

GPU 30 provides improved flexibility for adapting incoming pixel value transport formats to display native resolutions. At detection of a pixel source, GPU 30 or other logic in display 26 exchanges configuration information with the pixel source to determine a most effective transport format. The selected transport format may result in direct communication to timing controller 32 or communication through scalar 28 if these options provide the best performance of display of visual information. If GPU 30 has a conversion algorithm that provides the best performance for a given pixel value transport format, then GPU 30 receives incoming pixel values, provides the conversion to the display format and forwards the converted pixel values to timing controller 32. In the event that GPU 30 does not have an appropriate conversion algorithm, GPU 30 requests an update from information handling system 10. Information handling system 10 sends an appropriate conversion algorithm if one is available. If not, information handling system 10 retrieves the conversion algorithm from a network connection. GPU 30 programs the conversion algorithm to adapt to the transport format as needed. Although the above example describes conversion from HD to UHD formats, in alternative embodiments other types of conversions are supported. For example, 4k display resolution may involve a variety of different sized pixel arrays and refresh rates. Transport formats may include Digital Cinema Initiatives (DCI) formats or limited HD formats. Eventually when higher resolution displays are introduced, such as 8K resolutions, GPU 30 may be programmatically adapted to accept 8K resolution pixel formats for conversion to a native 4k display resolution. In one embodiment, GPU 30 may leverage processing capabilities of an installed scalar processor 28 by first directing a transport format to scalar 28 and then applying a conversion algorithm to the output of scalar 28 to forward pixels from GPU 30 to timing controller 32.

In one embodiment, GPU 20 disposed in information handling system 10 provides pixel value conversion from transport to display formats so that an acceptable pixel format is communicated to display 26. For example, logic in chipset 18 detects a transport pixel format from multimedia device 11 and a display resolution from display 26 and programs GPU 20 to convert pixel values received from multimedia device 11 into a transport format acceptable to display 26, such as a native resolution of display 26 or a resolution managed by scalar 28. Advantageously, information handling system 10 adapts display 26 to accept a variety of multimedia formats in a programmable manner. If, for example, display 26 lacks a scalar 28 that will convert from a low resolution, like DVD, to a high resolution, like 4k, then information handling system 10 programs its GPU 20 as an intermediary that performs the conversion. Once GPU 20 converts the pixel values from the multimedia device 11 transport format into a high resolution format, the pixel values are in turn communicated to port 22 for use by timing controller 32 to create the visual image at pixels 34.

Referring now to FIG. 2, a flow diagram depicts a process for selecting a display resolution scaling operation with a GPU available at the display to convert display formatting. The process starts at step 36 with discovery at the display of a multimedia source format, such as by an exchange of configuration information between the display and information handling system graphics processors. At step 38 if a match exists between the source and native pixel formats, the process continues to step 40 to display the visual information at the display native resolution, such as by directing incoming pixel values directly to the display timing controller. If a match is not found at step 38, the process continues to step 42 to determine if the source format matches a capability of a scalar processor integrated in the display. If a match is found at step 42, the process continues to step 44 to present the visual information by directing the incoming pixel values through the scalar to the timing controller. If the scalar does not match the incoming pixel values at step 42, the process continues to step 46 to program the graphics processor of the display to scale the source format to the native format and to step 48 to display the visual images with pixel values forwarded from the display graphics processor to the timing controller.

Referring now to FIG. 3, a flow diagram depicts a process for selecting a conversion algorithm at the display graphics processor. The process starts at step 52 by receiving the source format at the display from a source information handling system. At step 54, the graphics controller of the display compares the incoming pixel value format with available conversion algorithms. If no compatible conversion algorithm exists, the process continues to step 56 to download a conversion algorithm and program the display graphics processor to convert the incoming pixel values to the native resolution. At step 58, the selected conversion algorithm is applied to convert the pixel values and present the visual image at the display native resolution.

Referring now to FIG. 4, a flow diagram depicts a process for coordinating conversion of a transport format into a display format at a display graphics processor. The process starts at step 60 with an exchange of configuration information between the display and information handling system that defines available pixel value transport formats and conversion algorithms. At step 62, the information handling system and display coordinate a common transport format for the pixel values. For example, the transport format is selected from plural available transport formats based upon the programmable conversion algorithms of the display graphics processor. If more than one transport format is available, the most effective conversion algorithm is selected to provide the best available display resolution. At step 64, the pixel values are sent from the information handling system to the display with the selected transport format. At step 66, the graphics processor applies the selected conversion algorithm to the incoming pixel data to adapt the pixel information for presentation at the display. As described above, the conversion may leverage a scalar in the display by directing pixel values through the scalar either before or after conversion by the graphics processor.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions to process information;
   a memory disposed in the housing and interfaced with the processor, the memory operable to store the information;
   a graphics processor disposed in the housing and interfaced with the processor and memory, the graphics processor operable to convert the visual information into pixel values having a first or second transport resolution for presentation as visual images at a display, the first and second transport resolutions different from each other;
   a cable port interfaced with the graphics processor and operable to communicate the pixel values in the first or second transport resolutions to the display;
   the display coupled to the cable port by a cable and presenting visual images in a native resolution;
   a graphics processor unit integrated in the display and interfaced with the cable to accept the pixel values in the first transport resolution and to convert the pixel values to the native resolution;
   a scalar integrated in the display and interfaced with the cable, the scalar operable to accept pixel values in the second transport resolution and to convert the pixel values to the native resolution; and
   a timing controller interfaced with graphics processor unit and operable to forward the pixel values to pixels in the native resolution for presentation of the visual information as visual images;
   wherein pixel values are communicated to the graphics processor unit if in the first transport resolution and communicated to the scalar if in the second transport resolution.

2. The information handling system of claim 1 wherein the first transport resolution comprises High Definition resolution and the native resolution comprises Ultra High Definition resolution.

3. The information handling system of claim 1 wherein the graphics processor of the housing and the graphics processor unit of the display communicate configuration information through the cable defining the first transport resolution and native resolution.

4. The information handling system of claim 1 wherein the graphics processor of the housing communicates a conversion algorithm to the graphics processor unit of the display, the graphics processor unit of the display applying the conversion algorithm to convert the pixel values.

5. The information handling system of claim 4 wherein the graphics processor of the housing retrieves the conversion algorithm from a network location.

6. The information handling system of claim 1 wherein the graphics processor of the housing has plural transport resolution formats available to send the pixel information, the graphics processor of the housing selecting one of the plural transport resolution formats to use as a transport resolution based upon capabilities retrieved from the graphics processor unit of the display.

7. The information handling system of claim 6 wherein the graphics processor of the housing selects the transport resolution based upon capabilities retrieved from the scalar.

8. A method for presenting visual images at a display having a native resolution with visual information received from an information handling system, the method comprising:
   generating pixel values at graphics processor of the information handling in one of a first or second transport resolution, the first and second transport resolutions different from each other;
   communicating the pixel values to the display in the one of the first or second transport resolutions;
   if the pixel values are in the first transport resolution, receiving the pixel values at a graphics processor integrated in the display;
   if the pixel values are in the second transport resolution, receiving the pixel values at a scalar integrated in the display;
   converting the pixel values received at the graphics processor with the graphics processor from the first transport resolution to the native resolution;
   converting the pixel values received at the scalar with the scalar from the second transport resolution to the native resolution; and
   presenting the visual information at the display with the pixel values in the native resolution.

9. The method of claim 8 wherein the first transport resolution comprises High Definition and the second transport resolution comprises Ultra High Definition.

10. The method of claim 8 further comprising:
    communicating a conversion algorithm from the information handling system to the graphics processor of the display;
    programming the graphics processor of the display with the conversion algorithm; and
    converting the pixel values with the conversion algorithm.

11. The method of claim 10 wherein communicating a conversion algorithm is performed in response to the display communicating incompatibility with the first transport resolution, and the conversion algorithm converts from the first transport resolution to the native resolution.

12. The method of claim 8 further comprising:
    exchanging configuration information between the information handling system and display;
    applying the configuration information at the information handling system to select the first transport resolution from plural transport resolutions based upon conversion capabilities of the display in the configuration information.

13. The method of claim 12 further comprising:
    selecting the first transport resolution for compatibility with the scalar; and
    selecting the first transport resolution for compatibility with conversion algorithm programmed on the graphics processor of the display if a scalar is not available on the display.

14. The method of claim 13 further comprising:
selecting the first transport resolution for compatibility with a programmable conversion algorithm if the graphics processor does not have a compatible conversion algorithm; and
communicating the programmable conversion algorithm from the information handling system to the display to program the graphics processor of the display.

15. The display of claim 14 wherein the native resolution comprise Ultra High Definition and the plural different transport resolutions comprises High Definition.

16. The display of claim 14 wherein the graphics processor accepts a conversion algorithm from the external pixel source and applies the conversion algorithm to convert pixel values from the selected of the transport resolutions to the native resolution.

17. A display comprising:
pixels that present a visual image at a native resolution;
a timing controller interfaced with the pixels and operable to forward pixel values to the pixels in the native resolution that define the visual image, the pixel values received through a cable and having a selected of plural different transport resolutions;
a graphics processor interfaced with the timing controller and an external pixel value source, the external pixel source providing the pixel values in a first of the plural different transport resolutions, the graphics processor programmed to execute a conversion algorithm that converts the pixel values from the first of the plural different transport resolutions to the native resolution; and
a scalar that converts a second of the plural different transport resolutions received from the external pixel source to the native resolution.

* * * * *